July 12, 1927.  
J. H. TUCKER  
CAR TRUCK  
Filed Feb. 13, 1925  
1,635,910  
3 Sheets-Sheet 1
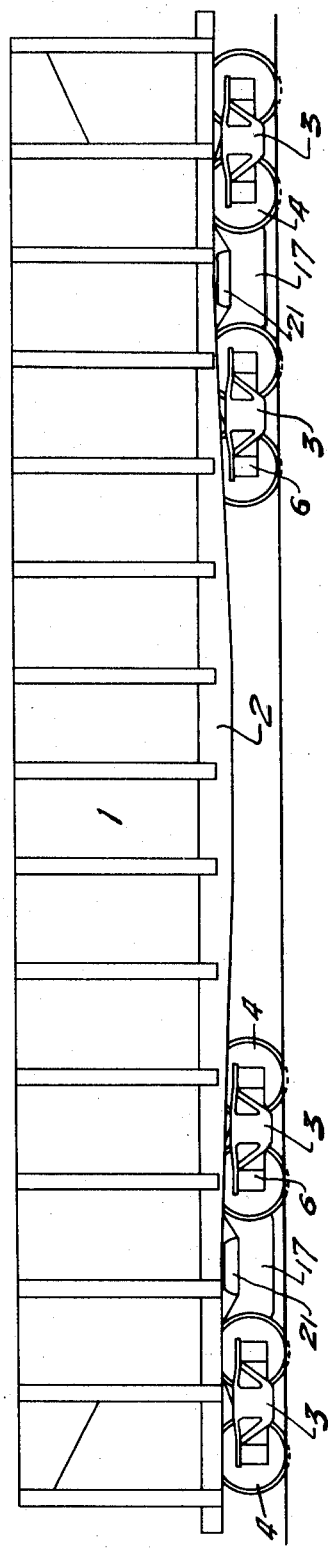
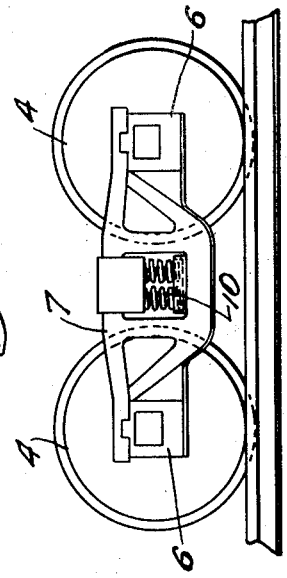
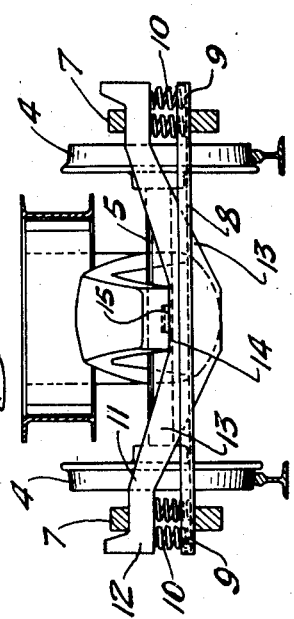
Inventor  
James H. Tucker  
By *[signature]*  
Attorney July 12, 1927. 1,635,910
J. H. TUCKER
CAR TRUCK
Filed Feb. 13, 1925 3 Sheets-Sheet 2
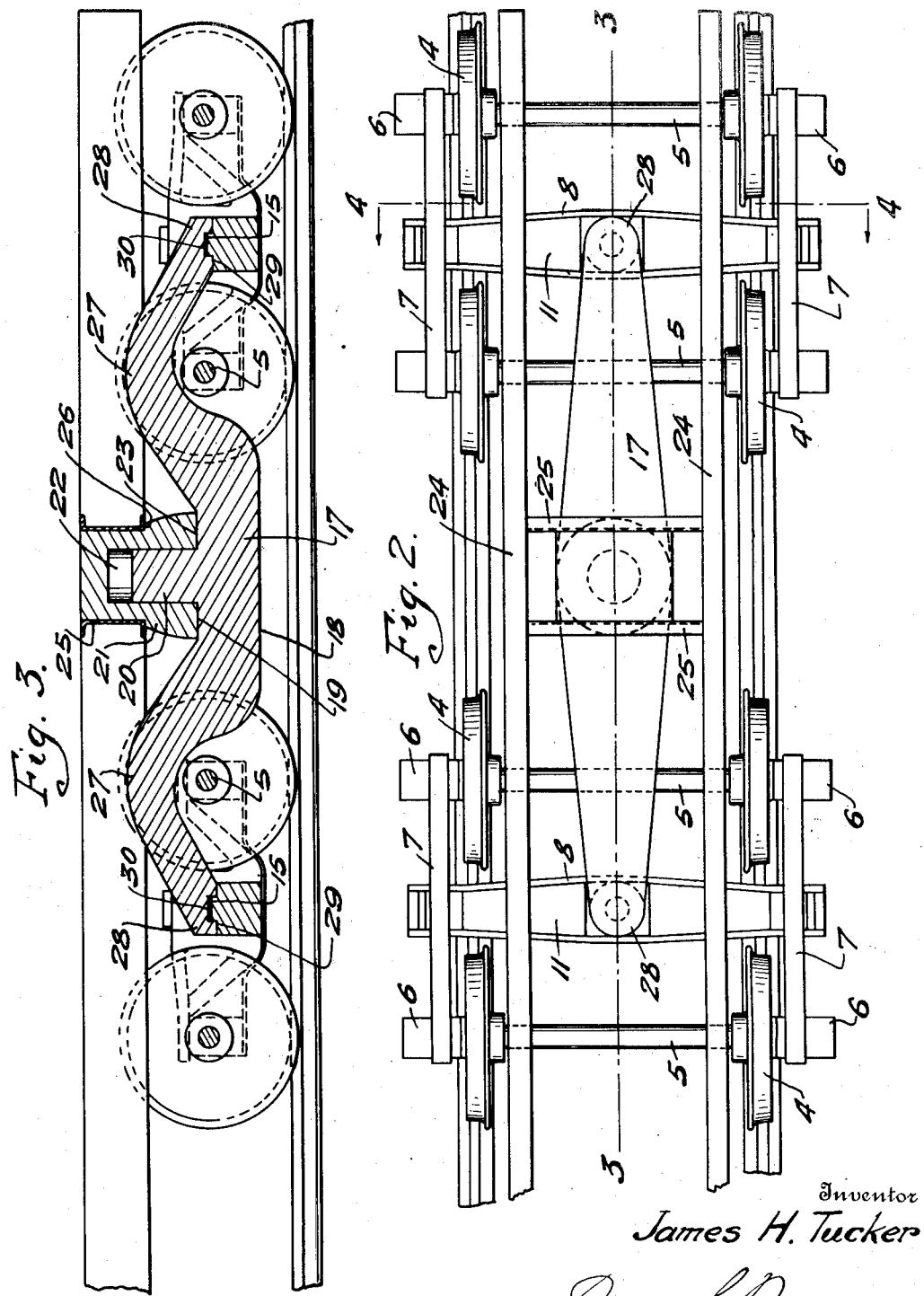
Inventor
James H. Tucker July 12, 1927.
J. H. TUCKER
CAR TRUCK
Filed Feb. 13, 1925
1,635,910
3 Sheets-Sheet 3
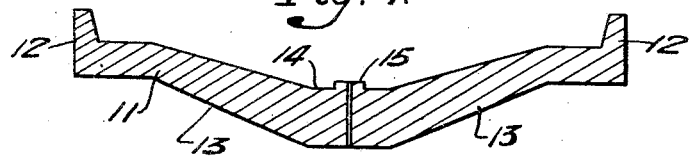
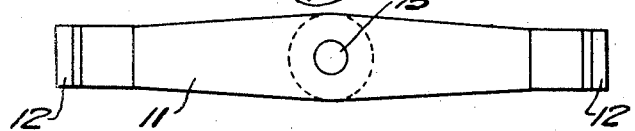
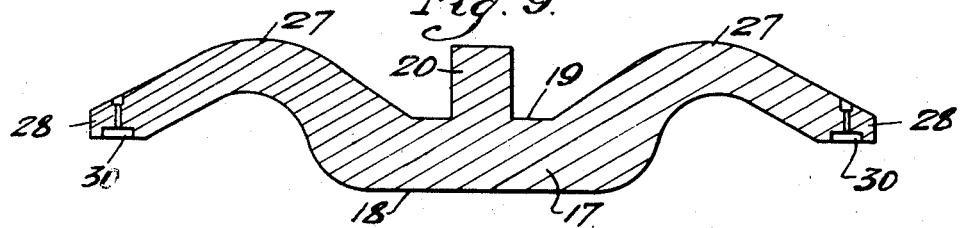
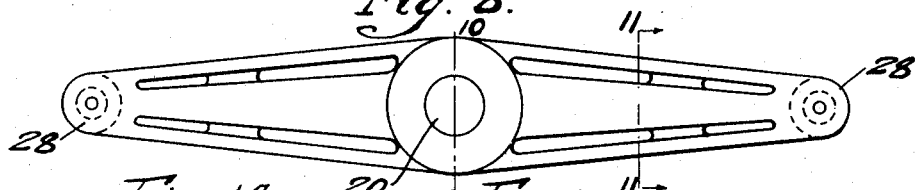
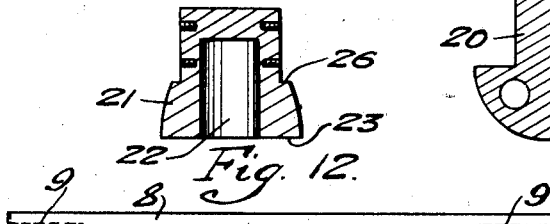
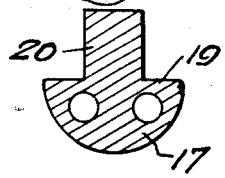
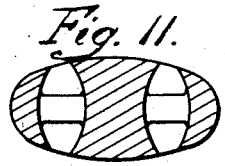
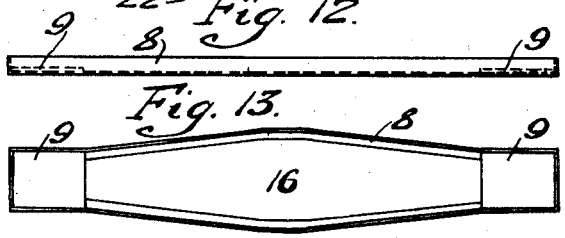
Inventor
James H. Tucker
By
Attorney Patented July 12, 1927.

1,635,910

UNITED STATES PATENT OFFICE.

JAMES H. TUCKER, OF PETERSBURG, VIRGINIA.

CAR TRUCK.

Application filed February 13, 1925. Serial No. 8,985.

The present invention relates to improvements in trucks for railway cars and more particularly freight cars, and the primary object of the invention is to provide a novel and improved structure whereby two trucks of the kinds commonly used, one at each end of the car, may be combined or coupled as a pair and placed under each end of the car instead of the single truck now generally used, whereby the weight of the car and its load, at each end thereof, is distributed between and sustained by the wheels of the pair of trucks instead of by the wheels of a single truck, as heretofore, thus enabling the load-carrying capacity of the car to be greatly increased and enabling car bodies of larger size and of greatly increased carrying capacity to be used.

One of the features of the present invention comprises a novel and improved bolster construction for the trucks and a novel and improved longitudinal bolster to connect the truck bolsters and mount the body thereon whereby a pair of trucks may be accommodated beneath the end of the car body without increasing the height thereof above the track, thus keeping the center of gravity of the car relatively low and facilitating the loading and unloading of the car and improving its riding ability on the track.

Another feature of the invention consists in providing bolster constructions which anable old trucks of the types heretofore used as single trucks to be utilized by arranging them in pairs beneath the ends of the cars, thus enabling relatively light trucks which would otherwise be discarded, to be used as elements of the double truck combination, and the car body may be swung relatively low above the track, with the advantages above set forth.

Another feature of the present invention consists in providing a novel and improved center bearing for mounting the car body on the longitudinal bolster, whereby ample strength to sustain the increased load is afforded, any tendency for the longitudinal bolster to tilt laterally or upset, due to side thrust, or other causes, is prevented, and the necessity of using the usual center bearing pin is avoided.

To these and other ends, the invention consists in certain improvements and combinations and arrangements of parts, all as will be hereinafter described fully, the features of novelty being pointed out particularly in the claims at the end of the specification.

In the accompanying drawings:—

Figure 1 is a side elevation of a freight car equipped with trucks embodying the present invention;

Figure 2 represents, on an enlarged scale, a top plan view of the underframe at one end of the car and the double trucks mounted beneath it;

Figure 3 represents a longitudinal vertical section through the structure shown in Figure 3, the section being taken on the line 3—3 of that figure;

Figure 4 represents a transverse section through the truck structure, the section being taken on the line 4—4, Figure 2, and looking in the direction of the arrows;

Figure 5 is a side elevation of one of the single trucks which comprises an element of the double truck structure, this truck being shown equipped with a transverse bolster embodying the present invention;

Figure 6 is a detail view showing in top plan a transverse bolster for the single truck;

Figure 7 represents a vertical, longitudinal section through the bolster shown in Figure 6;

Figure 8 is a top plan view of the longitudinal bolster which is mounted on and connects the transverse bolsters of the pair of trucks and supports the respective end of the car body thereon;

Figure 9 represents a longitudinal vertical section through the bolster shown in Figure 8;

Figure 10 represents a transverse vertical section through the bolster shown in Figure 8, the section being taken on the line 10—10 of that figure;

Figure 11 represents, on an enlarged scale, a transverse vertical section taken through the bolster shown in Figure 8 on the line 11—11 of that figure;

Figure 12 is a detail view showing in longitudinal elevation the spring plank of the truck constructed or adapted to receive the improved transverse bolster;

Figure 13 is a top plan view of the spring plank shown in Figure 12.

Figure 14 is a vertical section of a main or center bearing provided by the present invention for supporting the car body on the longitudinal bolster.

Similar parts are designated by the same reference characters in the several views.

The present invention is applicable generally to railway cars where it is desirable or necessary to increase the tonnage or load-carrying capacity thereof, it being particularly applicable to freight cars of the various types generally used to meet the demand for greater tonnage or carrying capacity as compared with cars and equipment of the size which have been previously used and are regarded as inadequate. The invention is applicable to new equipment, but it is particularly intended to be employed for the purpose of enabling the relatively small or light load capacity trucks such as those which have been previously used, one at each end of a car, and which have been rendered obsolete, or substantially so, by the demand for increased tonnage or load-carrying capacity and, hence, have been discarded and replaced largely by heavier equipment, to be utilized as elements of a double truck. The present invention enables pairs of such trucks to be combined or coupled and placed beneath the ends of a car so that the weight at each end of the car will be sustained by a pair of trucks instead of by a single truck, as heretofore, thus increasing the tonnage or load-carrying capacity up to double that of a car equipped at its ends with single trucks. The frames or the entire car bodies can be altered, modified or built to provide the desired carrying capacity thereof, and such car bodies may be readily mounted on the improved truck structure. The truck structure provided by the present invention enables the car body to be mounted thereon so that its height above the rails is no greater than where single trucks are used, and the car body may be swung lower above the rails than has been usual where single trucks are used, thus improving the stability and riding ability of the car on the track and facilitating the loading and unloading thereof.

The preferred embodiment of the invention is shown in the accompanying drawings and will be hereinafter described in detail. It is to be understood, however, that the invention is not restricted to the precise construction shown, as equivalent constructions are contemplated, and such will be included within the scope of the claims.

In the present instance, 1 designates generally the body of a freight car and 2 designates the frame thereof. 3 designates, in each instance, a truck which may be of any of the types heretofore used on railway cars, it having been customary to employ one of such trucks to support each end of the car body. Each truck, as shown, is of the four-wheel type, the wheels 4 being connected in pairs by axles 5 and the journals of the axles fitted into bearing boxes 6 arranged at the outer sides of the wheels. Each single truck generally comprises a pair of side frames 7 which are located longitudinally of the truck and outside of the wheels, the side frames being connected by a spring plank 8 which extends transversely across the truck between the pairs of wheels thereof and is fixed at its ends to the respective side frames. The outer ends of the spring plank are provided with spring seats 9 on which rest springs 10, the latter serving to support a bolster which may be of different forms and extends transversely across the truck and sustains the weight of the car body imposed thereon. In the ordinary truck structure, the transverse truck bolster carries or forms one part of the center bearing of the car, and the car body rests directly thereon, but such bolsters are replaced by other bolsters which will be hereinafter described, in applying the present invention to trucks of the old single truck types which have been previously used.

According to the present invention, a longitudinal bolster is provided which has a bearing intermediately of its length on which the car body rests, and this bolster spans or extends over the axles at the inner ends of a pair of trucks and bears on the transverse bolsters of the trucks, the intermediate portion of the longitudinal bolster on which the car body rests having a drop or downward offset therein which enables the car body to occupy a position close to the longitudinal bolster, and the ends of the longitudinal bolster are offset upwardly to rest on the centers of the transverse truck bolsters which have a drop or downward offset therein so that the longitudinal bolster may occupy a position on substantially a level with the trucks and may be hung close down to the rails.

In the construction shown in the present instance, a transverse bolster 11 is provided for each truck in place of the type of bolster previously used in such trucks. The improved transverse bolster has its ends 12 arranged to extend outwardly through the side frames 7 of the truck so that they will rest on the springs 10 while the intermediate portion 13 of the bolster is sloped or otherwise offset downwardly to bring its middle portion into a depressed position below the ends of the bolster, and the middle of the bolster, at the upper side thereof, is formed with a bearing 14 which is preferably provided with an upstanding pivot pin or projection 15. The offset in the transverse bolster may be sufficient to bring the bearing 14 below the tops of the axles 5, as shown. In this construction, the intermediate portion of the transverse bolster extends below the spring plank 8, and in order to permit this, the portion of the spring plank between the spring seats 9 thereof is widened, as by spreading apart the channel or angle iron members composing it, to provide a relatively wide opening 16 in which the central or intermediate portion of the transverse bolster may be accommodated and through which it may operate.

In carrying out the present invention, a longitudinal bolster 17 is also provided. This bolster comprises an intermediate portion 18 which is adapted to extend longitudinally and to be accommodated between the adjacent ends of a pair of trucks, and this intermediate portion of the longitudinal bolster is provided with a center bearing for attachment to the car body whereby it will receive the weight thereof. As shown, the intermediate portion of this bolster is formed with a relatively flat annular bearing surface 19 and a pivot pin 20 which is preferably cylindrical and projects upwardly therefrom. The car body or its frame preferably carries a bearing member 21 which has a cylindrical bore 22 to receive and closely fit the pivot pin 20 on the bolster 17 and the lower end of this bearing member has a bearing face 23 which rests and fits on the bearing 19 formed on the upper side of the bolster. The bearing member 21 may be mounted on the car body or its frame in different ways. For example, the car body may have an angle iron frame comprising longitudinal frame members 24, and the bearing member 21 may be secured by fitting it between cross-members 25 which may be of channel form, as shown in Figure 3, the bearing member 21 having a shoulder 26 thereon to abut against the lower edges of the cross members 25, and thereby transmit the weight of the car body to the longitudinal bolster 17. The bearing member 21 is prevented from tilting or lateral displacement by confining it between the frame cross members 25 and riveting, bolting or otherwise securing it thereto. By providing the bearings 19 and 23 on the bolster and bearing member 21, and the pivot pin 20 on the bolster to fit into the bore 22 in the bearing member 21, any tendency of the bolster or the car body to tilt laterally is prevented. The ends of the longitudinal bolster which extend in opposite directions from its intermediate portion 18 are bent or offset upwardly as at 27 in order that they will extend over and clear the axles 5 at the inner ends of the trucks, and the extremities 28 of the longitudinal bolster are thence extended preferably in a downwardly inclined direction and are provided with bearings 29 to rest on the bearings 14 of the transverse bolsters 13 of the respective trucks, and these extremities are also formed with recesses 30 to receive the pivot pins or projections 15 on the transverse bolsters.

By constructing the transverse truck bolsters with central depressed or downwardly offset portions, and constructing the longitudinal bolster with a centrally depressed or downwardly offset central portion to receive the center bearing, the pair of single trucks, coupled by the longitudinal bolster, may be placed under the end of a car in place of the single truck heretofore used generally, and the car body will be supported at a relatively low elevation above the track. The central depressions in the transverse truck bolsters and on which the ends of the longitudinal bolster rest enable the longitudinal bolster to occupy a relatively low position with respect to the trucks, and the central depression of the longitudinal bolster which carries the center bearing enables the center bearing and the car body to be mounted at a relatively low elevation above the trucks. In consequence, the center of weight of the car is low, thus increasing the stability and the riding ability of the car and facilitating the loading and unloading thereof.

By providing a pair of trucks to support each end of the car, instead of the single truck heretofore used, the weight of the respective end of the car is distributed among the eight wheels of the two trucks, and as the weight of the car borne by the longitudinal bolster is imposed by the ends of this bolster upon the trucks at points which are equidistant from the four wheels of the respective truck, the distribution of the weight will be equal to the four wheels of each truck. The center bearing between the longitudinal bolster and the car body affords an equalizing action between the car body and this bolster, and the pivotal bearings connecting the ends of the longitudinal bolster to the transverse truck bolsters enable the trucks to pivot relatively to the longitudinal bolster and independently of one another. The wheels of the trucks are thus enabled to easily follow curves of short radius, switches, and inequalities in the rails.

I claim as my invention:—

1. A car truck comprising a pair of truck units each embodying a set of wheels, side frames connecting them, and a bolster supported at its ends in the side frames and having its central portion depressed to a level below its ends; and a connecting bolster having its ends bearing on said depressed portions of the respective truck unit bolsters.

2. A car truck comprising a pair of truck units each embodying a set of wheels, side frames connecting them, and a bolster having a bearing intermediately of its ends which is offset downwardly relatively to its ends, and a connecting bolster having a centrally depressed central portion on which a car body is adapted to rest and portions at opposite sides of its central portion which are offset upwardly to extend above the axles of the truck units, the ends of the connecting bolster bearing on the downwardly offset portions of the bolsters of the respective truck units.

3. A car truck comprising a pair of truck units each embodying a transverse bolster having a central portion which is offset downwardly relatively to its ends, and a connecting bolster having a central relatively depressed bearing portion to receive the weight of a car body, said depressed portion occupying a position between the proximate axles of the truck units, the ends of the connecting bolster bearing on the offset portions of the respective bolsters of the truck units.

4. A car truck comprising a pair of wheeled truck units each embodying a transverse bolster having a central relatively depressed bearing portion, and a connecting bolster having a central relatively depressed bearing portion to receive the weight of a car body and having end portions which extend over the proximate axles of the truck units and bear on the depressed bearing portions of the respective truck unit bolsters.

5. A car truck comprising a pair of wheeled truck units having transverse bolsters, and a connecting bolster extending longitudinally between the wheels of the truck units and having its ends connected to the bolsters of the respective truck units, said connecting bolster having an intermediate portion which is relatively depressed to a level below the tops of the truck units and is provided with a bearing to receive the weight of a car body.

6. A car truck comprising a pair of wheeled truck units having transverse bolsters, a connecting bolster connected at its ends to the bolsters of the respective truck units and having a relatively depressed intermediate portion provided with a horizontal bearing and an upwardly projecting pivot, and a bearing member adapted for attachment to a car body and having a horizontal bearing surface on its lower end to rest on the bearing on the bolster and a vertical socket to receive the pivot.

7. A car truck comprising a pair of wheels, side frames connecting them, a spring plank connecting the side frames and having the bottom of its intermediate portion cut away, and a bolster supported at its ends by the spring plank and having its intermediate portion depressed below its ends and arranged to project downwardly through the intermediate cut away portion of the spring plank.

8. In a truck construction for railway vehicles, two truck units each including a bolster, a body bolster carried by the vehicle, and a center beam having a pivoted bearing support at each end on the truck bolsters and providing intermediate its ends a pivoted bearing support for the body bolster, the center beam being depressed in the region of its engagement with the body bolster whereby to permit of the location of the points of bearing of the beam on the body bolster in substantially the same horizontal plane with the points of bearing of the beam on the truck bolsters.

In testimony whereof I have hereunto set my hand.

JAMES H. TUCKER.